United States Patent
Cheng et al.

(10) Patent No.: US 6,566,006 B1
(45) Date of Patent: May 20, 2003

(54) SULFUR-CONTAINING CATHODE

(75) Inventors: Song Cheng, Tucson, AZ (US); Jason D. West, Phoenix, AZ (US)

(73) Assignee: Moltech Corporation, Tucson, AZ (US)

( * ) Notice: Subject to any disclaimer, the term of this patent is extended or adjusted under 35 U.S.C. 154(b) by 0 days.

(21) Appl. No.: 09/668,707

(22) Filed: Sep. 20, 2000

(51) Int. Cl.⁷ .................... H01M 4/60; H01M 6/00; H01B 1/12
(52) U.S. Cl. .................... 429/212; 429/217; 429/218.1; 429/232; 29/623.1; 252/519.34
(58) Field of Search .................... 429/212, 218.1, 429/231.95, 233, 213, 215, 232, 217; 29/623.5, 623.4, 623.1; 252/519.34, 182.1

(56) References Cited

U.S. PATENT DOCUMENTS

| | | |
|---|---|---|
| 3,532,543 A | 10/1970 | Nole et al. |
| 3,953,231 A | 4/1976 | Farrington et al. |
| 4,303,748 A | 12/1981 | Armand et al. |
| 4,469,761 A | 9/1984 | Bennett et al. |
| 4,664,991 A | 5/1987 | Perichaud et al. |
| 4,739,018 A | 4/1988 | Armand et al. |
| 4,833,048 A | 5/1989 | De Jonghe et al. |
| 4,917,974 A | 4/1990 | De Jonghe et al. |
| 5,162,175 A | 11/1992 | Visco et al. |
| 5,194,341 A | 3/1993 | Bagley et al. |
| 5,478,676 A * | 12/1995 | Turi et al. .................... 429/234 |
| 5,516,598 A | 5/1996 | Visco et al. |
| 5,525,444 A | 6/1996 | Ito et al. |
| 5,529,860 A | 6/1996 | Skotheim et al. |
| 5,538,812 A | 7/1996 | Lee et al. |
| 5,601,947 A | 2/1997 | Skotheim et al. |
| 5,686,201 A | 11/1997 | Chu |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,846,674 A | 12/1998 | Sakai et al. |
| 5,882,819 A | 3/1999 | Naoi et al. |
| 5,935,724 A | 8/1999 | Spillman et al. |
| 5,935,728 A | 8/1999 | Spillman et al. |
| 6,110,619 A * | 8/2000 | Zhang et al. .................... 429/213 |
| 6,117,590 A | 9/2000 | Skotheim et al. |
| 6,153,337 A | 11/2000 | Carlson et al. |
| 6,183,901 B1 | 2/2001 | Ying et al. |
| 6,194,098 B1 | 2/2001 | Ying et al. |
| 6,201,100 B1 | 3/2001 | Gorkovenko et al. |
| 6,302,928 B1 * | 10/2001 | Xu et al. .................... 29/623.1 |

FOREIGN PATENT DOCUMENTS

| | | |
|---|---|---|
| EP | 0 414 990 A1 | 6/1991 |
| WO | WO 98/05085 | 2/1998 |
| WO | WO 99/33125 | 7/1999 |
| WO | WO 99/33127 | 7/1999 |
| WO | WO 00/36674 | 6/2000 |
| WO | WO 00/36678 | 6/2000 |

OTHER PUBLICATIONS

Rauh et al., "A Lithium/Dissolved Sulfur Battery with an Organic Electrolyte", *J. Electrochem. Soc.*, vol. 126, pp. 523–527 (1979).

Yamin et al., "Lithium Sulfur Battery, Oxidation/Reduction Mechanisms of Polysulfides in THF Solutions", *J. Electrochem. Soc.*, vol. 135, pp. 1045–1048 (1988).

Peled et al., "Rechargeable Lithium–Sulfur Battery", *J. Power Sources*, vol. 26, pp. 269–271 (1989).

Alamgir et al. "Room Temperature Polymer Electrolytes", *Lithium Batteries, New Materials, Developments and Perspectives*, Chapter 3, pp. 93–136, Elsevier, Amsterdam (1994).

Dominey, "Current State of the Art on Lithium Battery Electrolytes", *Lithium Batteries, New Materials, Developments and Perspectives*, Chapter 4, pp. 137–165, Elsevier, Amsterdam (1994).

* cited by examiner

*Primary Examiner*—Stephen Kalafut
*Assistant Examiner*—R Alejandro
(74) *Attorney, Agent, or Firm*—Jacqueline M. Nicol; Squire, Sanders & Dempsey L.L.P.

(57) ABSTRACT

Provided is a composite cathode comprising (a) an electroactive sulfur-containing material; (b) a crosslinked polymer formed from a reaction of a polymeric material having carboxyl groups and a crosslinking agent; and (c) a conductive filler. The crosslinked polymer improves the flexibility, adhesion, and cycle life of the composite cathode in electrochemical cells comprising the cathode. Also provided are electrochemical cells comprising such cathodes and methods for preparing such cathodes and electrochemical cells.

20 Claims, 1 Drawing Sheet

SULFUR-CONTAINING CATHODE

TECHNICAL FIELD

The present invention relates generally to the field of cathodes and rechargeable electrochemical cells. More particularly, the present invention pertains to solid composite cathodes which comprise: (a) an electroactive sulfur-containing material; (b) a crosslinked polymer formed from a reaction of a polymeric material having carboxyl groups and a crosslinking agent; and (c) a conductive filler. This crosslinked polymer improves the flexibility and adhesion of the cathode, and the cycle life of the cell.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

As consumer demand for, and reliance upon, portable and hand-held electronic devices such as mobile telephones, portable computers, pagers, and palm pilots has grown, so has the need for portable power supplies, such as rechargeable batteries, with long cycle life, rapid recharge capacity, and high energy density, become more important. There has been considerable interest in recent years in developing high energy density primary and secondary batteries with alkali-metal anode materials, and, in particular, anodes based on lithium.

Various types of cathode materials for the manufacture of thin film alkali-metal batteries are known in the art.

Elemental sulfur is an attractive cathode material in alkali-metal batteries owing to its low equivalent weight, low cost, and low toxicity. Many alkali-metal/sulfur cells have been described, as for example, in U.S. Pat. Nos. 3,532,543, 3,953,231, and 4,469,761; Rauh et al., *J. Electrochem. Soc.*, 1979, 126, 523–527; Yamin et al., *J. Electrochem. Soc.*, 1988, 135, 1045–1048; and Peled et al., *J. Power Sources*, 1989, 26, 269–271.

In spite of the many known systems, solid composite cathodes comprising elemental sulfur in rechargeable alkali metal sulfur battery systems have been problematic in obtaining good electrochemical efficiency, utilization, capacity, cycle life, and safety of the cells owing to the diffusion of sulfur-containing active materials from the sulfur-containing cathode into the electrolyte and other components of the electrochemical cells. This has been particularly true in electrochemical cells comprising a sulfur-containing cathode in combination with a lithium-containing anode.

One approach to addressing these problems has been through the use of polymeric binders in the composite cathodes. These polymeric binders fall generally into three types: (a) polymer electrolyte ionically conductive polymers; (b) electronically conductive polymers; and (c) non-ionically conductive and non-electronically conductive polymers, often referred to as inert binders.

Examples of polymer electrolyte polymers used in sulfur-containing solid composite cathodes include polyethylene oxides, polypropylene oxides, polyacrylonitriles, polysiloxanes, polyimides, polyethers, sulfonated polyimides, divinyl polyethylene glycols, polyethylene glycol-bis acrylates, polyethylene glycol-bis methacrylates, polyphosphazenes, and polyether grafted polysiloxanes, as for example described in U.S. Pat. No. 4,303,748 to Armand et al.; in U.S. Pat. Nos. 5,529,860 and 5,690,702 to Skotheim et al.; and, in U.S. Pat. No. 5,686,201 to Chu. These polymer electrolyte polymers have ionically conductive properties which may improve the electrochemical utilization, efficiency, and capacity upon cycling of the cell.

Examples of electronically conductive polymers used in sulfur-containing solid composite cathodes include polyanilines, polyacetylenes, polypyrroles, polythiophenes, polyphenylene-vinylenes, polythienylene-vinylenes, and polyphenylenes, as for example described in U.S. Pat. Nos. 5,529,860 and 5,690,702 to Skotheim et al. and in U.S. Pat. No. 5,686,201 to Chu. These electronically conductive polymers provide electrical conductivity to the solid composite cathodes and may have electrocatalytic properties to improve the electrochemical utilization, efficiency, and capacity of the cell.

Examples of inert binders used in sulfur-containing solid composite cathodes include polytetrafluoroethylenes and other fluorinated polymers, styrene butadiene rubbers, and ethylene-propylene-diene rubbers, as for example described in U.S. Pat. Nos. 5,529,860 and 5,690,702 to Skotheim et al. These inert binders typically provide mechanical strength and improved cohesion and adhesion to the solid composite cathode layer. In U.S. Pat. No. 5,846,674, to Sakai et al., reaction-curing binders for lithium transition metal oxide electrode active materials, by heat and/or radiation curing, possessing enhanced adhesion to metal foil current collectors in non-aqueous cells, are described. Examples of reaction curing binders include urethane oligomers and acrylates.

Another type of polymeric binder are cationic polymers, as described in U.S. Pat. No. 6,110,619 to Zhang et al., that improve the electrochemical utilization and cycling efficiency of sulfur-containing electroactive materials when incorporated into the cathode of an electrochemical cell.

An alternative method of preparing the sulfur-containing solid composite cathodes comprises heating an electroactive sulfur-containing material to a temperature above its melting point and then resolidifying the melted electroactive sulfur-containing material to form a cathode active layer having redistributed sulfur-containing material of higher volumetric density than before the melting process, for example, as described in PCT Publication No. WO 00/36674 to Xu et al.

Despite these approaches there still remains a need for improved binders which provide in sulfur-containing solid composite cathodes a combination of mechanical strength, flexibility, adhesion, coatability, increased electrochemical utilization, efficiency, and capacity in the cycling of the electroactive cathode material, and inertness to chemical reaction with the electroactive cathode material and other components of the cell, such as liquid electrolytes, that may contact the polymeric binder.

SUMMARY OF THE INVENTION

The solid composite cathode of the present invention for use in an electrochemical cell comprises: (a) an electroactive sulfur-containing material; (b) a crosslinked polymer formed from a reaction of a polymeric material having carboxyl groups and a crosslinking agent; and (c) a conductive filler.

In one embodiment of the present invention, the polymeric material having carboxyl groups is selected from the group consisting of polymers and copolymers of acrylic acid, methacrylic acid, crotonic acid, fumaric acid, and maleic acid. In a preferred embodiment, the polymeric material having carboxyl groups is a copolymer of acrylic acid selected from the group consisting of ethyl acrylate-acrylic acid copolymers, butyl acrylate-acrylic acid copolymers, vinyl pyrrolidone-acrylic acid copolymers, ethylene-acrylic acid copolymers, and vinyl acetate-acrylic acid copolymers. In another preferred embodiment, the polymeric material having carboxyl groups is a copolymer of crotonic acid.

Suitable crosslinking agents include, but are not limited to, those selected from the group consisting of aziridines, phenolic resins, and melamine resins. In one embodiment, the aziridine is selected from the group consisting of trimethylol propane tris [β-(N-2-methyl aziridinyl)propionate], trimethylol propane tris [β-(N-aziridinyl)propionate], and pentaerythritol tris [β-(N-aziridinyl)propionate].

Suitable conductive fillers include, but are not limited to, those selected from the group consisting of carbon black, graphites, activated carbon fibers, non-activated carbon nanofibers, metal flakes, metal powders, and electrically conductive polymers.

In one embodiment of the present invention, the solid composite cathode comprises 60 to 85% by weight of an electroactive sulfur containing material. In one embodiment of the present invention, the solid composite cathode comprises 2 to 10% by weight of the crosslinked polymer. In one embodiment of the present invention, the solid composite cathode comprises 15 to 35% by weight of a conductive filler.

In one embodiment, the electroactive sulfur containing material comprises elemental sulfur. In one embodiment, the electroactive sulfur containing material, in its oxidized state, comprises a polysulfide moiety of the formula, $S_m$, wherein m is an integer equal to or greater than 3. In yet another embodiment, the electroactive sulfur containing material comprises a sulfur-containing organic polymer.

Another aspect of the present invention pertains to methods of preparing a solid composite cathode comprising the steps of: (a) dispersing or dissolving, in a liquid medium, an electroactive sulfur-containing material, a polymeric material having carboxyl groups, a crosslinking agent, and a conductive filler; (b) casting the composition resulting from step (a) onto a suitable substrate; and (c) removing some or all of the liquid from the composition resulting from step (b) and crosslinking the polymeric material and the crosslinking agent to provide a solid composite cathode.

In one embodiment, the substrate is a metallized plastic film. In one embodiment, the metallized plastic film is less than 15 microns in thickness.

Another aspect of the invention pertains to an electrochemical cell comprising an anode comprising lithium and a composite cathode, as described herein.

DETAILED DESCRIPTION OF THE INVENTION

Figure 1:
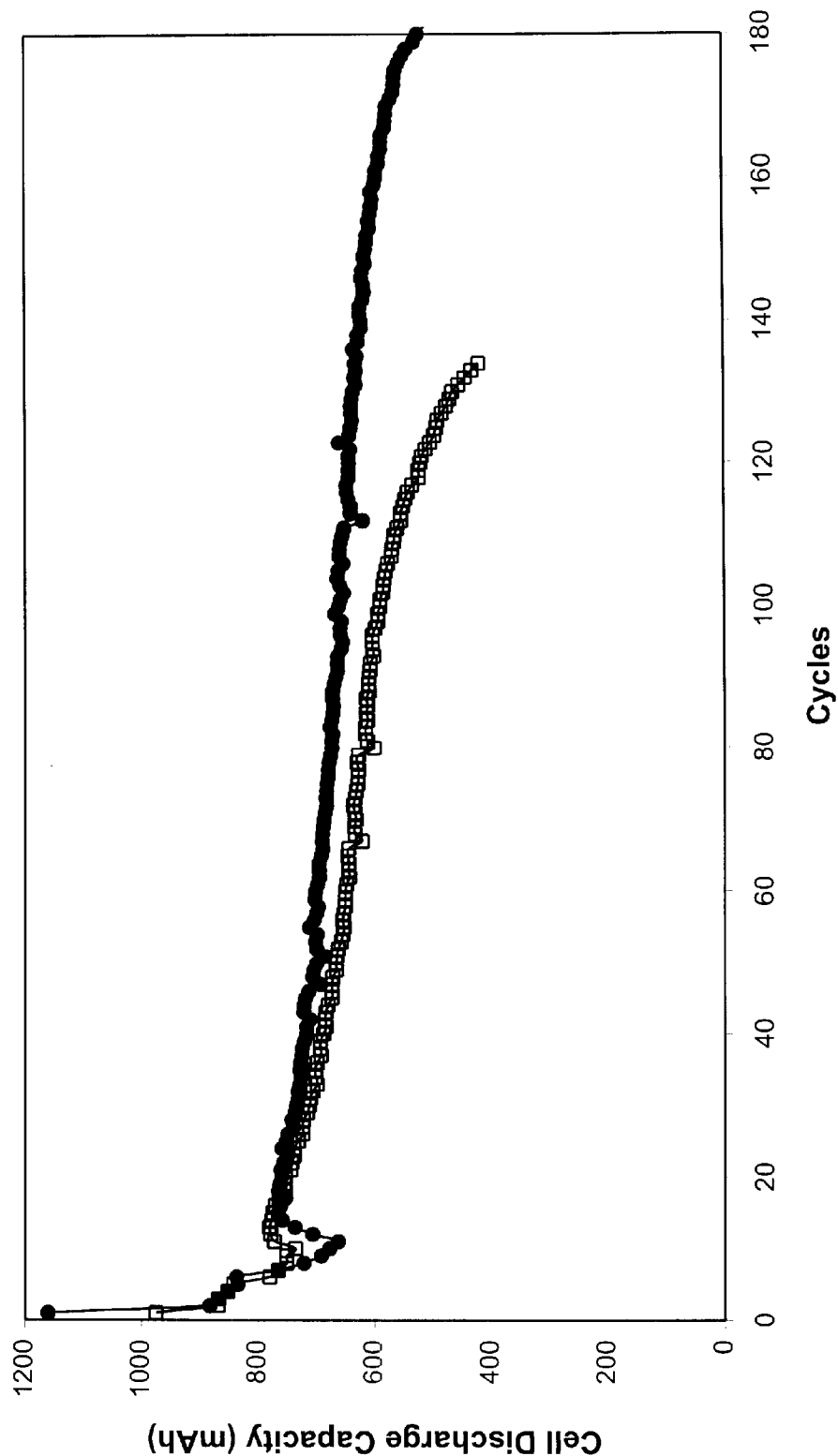
FIG. 1 shows the discharge capacity (mAh/g) vs. cycle number for cells of Example 1 (•) and cells of Comparative Example 1 (□).

One aspect of the present invention pertains to a solid composite cathode for use in an electrochemical cell comprising: (a) an electroactive sulfur-containing cathode active material; (b) a crosslinked polymer formed from a reaction of a polymeric material having carboxyl groups and a crosslinking agent; and (c) a conductive filler.

The solid composite cathodes of the present invention are particularly preferred for use in electrochemical cells, rechargeable batteries, fuel cells, and the like, which comprise electroactive sulfur-containing cathode active materials and which require high energy density.

A variety of polymeric binders have been utilized in the solid composite cathodes of electrochemical cells, including those based on sulfur-containing cathodes. Some desirable properties for these polymeric binders include, but are not limited to, providing mechanical strength to the solid composite cathode, providing adhesion, providing coatability, providing increased electrochemical utilization, efficiency, and capacity in the cycling of the electroactive cathode material, and providing inertness to chemical reaction with the electroactive cathode material and other components of the cell that may contact the polymeric binder.

In one aspect of the present invention, the composite cathode comprises a crosslinked polymeric binder formed from a reaction of a polymeric material having carboxyl groups and a crosslinking agent. Suitable polymeric materials having carboxyl groups include, but are not limited to, polymers and copolymers of vinyl carboxylic acids. Preferred polymeric materials having carboxyl groups are polymers and copolymers of acrylic acid, methacrylic acid, crotonic acid, fumaric acid, and maleic acid. More preferred are polymers and copolymers of acrylic acid and crotonic acid. Most preferred are copolymers of acrylic acid and crotonic acid. Suitable copolymers include, but are not limited to, ethyl acrylate-acrylic acid copolymers, butyl acrylate-acrylic acid copolymers, vinyl pyrrolidone-acrylic acid copolymers, ethylene-acrylic acid copolymers, vinyl acetate-acrylic acid copolymers, and vinyl acetate-crotonic acid copolymers. The amount of carboxyl groups in the polymeric materials may vary over a range from about 5 mole % to 100 mole % of the monomer units in the polymeric material. Preferred amounts of carboxyl groups in the polymeric materials are from about 5 mole % to about 50 mole % of the monomer units in the polymeric material.

Suitable crosslinking agents for forming the crosslinked polymeric binders from the polymeric material having carboxyl groups include, but are not limited to, aziridines, phenolic resins, and melamine resins. Melamine resin crosslinking agents include, for example, condensates of melamine with formaldehyde and lower alcohols, such as methanol, ethanol, butanol, and isobutanol. Examples of melamine resins include those sold under the trademark Resimene® by Solutia Inc., St. Louis, Mo. Phenolic resin crosslinking agents include, for example, condensates of phenol with formaldehyde and lower alcohols, such as methanol, ethanol, butanol, and isobutanol. Examples of phenolic resins include those sold under the trademark Santolink® by Solutia Inc., St. Louis, Mo. Preferred crosslinking agents are multifunctional aziridines selected from the group consisting of trimethylol propane tris [β-(N-2-methyl aziridinyl)propionate], trimethylol propane tris [β-(N-aziridinyl)propionate], and pentaerythritol tris [β-(N-aziridinyl)propionate].

The crosslinked polymeric binder of the present invention may be formed from a range of ratios of the polymeric material having carboxyl groups and the crosslinking agent. Suitable weight ratios of the polymeric material having carboxyl groups to the crosslinking agent are from about 10:1 to about 1:1. Preferred weight ratios are from 6:1 to 3:1.

Suitable conductive fillers of the solid composite cathode include, but are not limited to, carbon black, graphite, graphite fibers, activated carbon fibers, non-activated carbon nanofibers, metal flakes, metal powders, metal fibers, and electrically conductive polymers. Preferred fillers are conductive carbons such as carbon black and graphite.

The weight ratios of the electroactive sulfur-containing material, the crosslinked polymer, and the conductive filler in the composite cathodes of the present invention may vary over a wide range. Preferred weight ratios are from 60 to 85% of the electroactive sulfur-containing material, from 2 to 10% of the crosslinked polymer, and from 15 to 35% of the conductive filler.

The solid composite cathode compositions of the present invention possess excellent adhesion to the current collectors so that long cycle life is achieved and at the same time high capacity is observed with low rate of fade. For example, as shown in FIG. 1, cells of Example 1 from a cathode comprising elemental sulfur, a crosslinked polymer formed from a reaction of a polymeric material having carboxyl groups and a crosslinking agent, and a conductive filler had a discharge capacity of 840 mAh at the $5^{th}$ cycle and 640 mAh at the $120^{th}$ cycle. The cells of Comparative Example 1, also shown in FIG. 1, lacking the crosslinked polymeric binder, had a discharge capacity of 840 mAh at the $5^{th}$ cycle and 525 mAh at the $120^{th}$ cycle, and thus a much more rapid capacity fade. The composite cathode of Comparative Example 3 comprising elemental sulfur, a polymeric material having carboxyl groups, and a conductive filler but lacking the crosslinking agent of the present invention, showed very poor adhesion and separated from the current collector in the presence of the non-aqueous electrolyte.

Electroactive Sulfur-Containing Materials

The term "electroactive sulfur-containing material," as used herein, relates to cathode active materials which comprise the element sulfur in any form, wherein the electrochemical activity involves the breaking or forming of sulfur-sulfur covalent bonds. Examples of suitable electroactive sulfur-containing materials, include, but are not limited to, elemental sulfur and organic materials comprising both sulfur atoms and carbon atoms, which may or may not be polymeric. Suitable organic materials include those further comprising heteroatoms, conductive polymer segments, composites, and conductive polymers.

In one preferred embodiment, the electroactive sulfur-containing material comprises elemental sulfur. In one preferred embodiment, the electroactive sulfur-containing material comprises a mixture of elemental sulfur and a sulfur-containing organic polymer.

In another embodiment, the sulfur-containing material, in its oxidized state, comprises a polysulfide moiety, $S_m$, selected from the group consisting of covalent $-S_m-$ moieties, ionic $-S_m^-$ moieties, and ionic $S_m^{2-}$ moieties, wherein m is an integer equal to or greater than 3, such as, for example, elemental sulfur and sulfur-containing organic polymers. Examples of sulfur-containing organic polymers include, but not limited to, those described in U.S. Pat. Nos. 5,601,947; 5,690,702; 5,529,860 to Skotheim et al; U.S. patent application Ser. No. 08/995,122, now U.S. Pat. No. 6,201,100, to Gorkovenko et al.; Ser. No. 09/033,218, now U.S. Pat. No. 6,117,590, to Skotheim et al.; Ser. No. 09/565,187 to Movchan et al.; and Ser. No. 09/565,184 to Kovalev et al., all of the common assignee, and incorporated herein by reference in their entirety. Other suitable electroactive sulfur-containing materials comprising polysulfide linkages include, but are not limited to, those described in U.S. Pat. No. 4,664,991 to Perichaud et al., and in U.S. Pat. Nos. 5,723,230; 5,783,330; 5,792,575; and 5,882,819 to Naoi et al.

In one embodiment, m of the polysulfide moiety, $S_m$, of the sulfur-containing polymer is an integer equal to or greater than 6. In one embodiment, m of the polysulfide moiety, $S_m$, of the sulfur-containing polymer is an integer equal to or greater than 8. In one embodiment, the sulfur-containing polymer has a polymer backbone chain and the polysulfide moiety, $S_m$, is covalently bonded by one or both of its terminal sulfur atoms on a side group to the polymer backbone chain. In one embodiment, the sulfur-containing polymer has a polymer backbone chain and the polysulfide moiety, $S_m$, is incorporated into the polymer backbone chain by covalent bonding of the terminal sulfur atoms of the polysulfide moiety.

Still further examples of electroactive sulfur-containing materials include those comprising disulfide groups as described, for example, in U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

Preferably, the electroactive sulfur-containing material comprises greater than 50% by weight of sulfur. More preferably, the electroactive sulfur-containing material comprises greater than 75% by weight of sulfur, and most preferably, the electroactive sulfur-containing material comprises greater than 90% by weight of sulfur.

Methods of Making Composite Cathodes

One aspect of the present invention pertains to methods for fabricating solid composite cathodes, as described herein.

One method employs a physical mixture of an electroactive sulfur-containing cathode active material, a polymeric material having carboxyl groups, a crosslinking agent, and a conductive filler, and optionally, electrolytes, non-electroactive metal oxides, and other additives, either as dry solids, or as a slurry in a solvent or mixture of solvents. The mixture is fabricated into a solid composite cathode structure of desired dimensions, for example, by casting, doctor blade coating, roll coating, dip coating, extrusion coating, calendering, and other means known in the art.

Mixing of the various components may be accomplished using any of a variety of methods so long as the desired dissolution or dispersion of the components is obtained. Suitable methods of mixing include, but are not limited to, mechanical agitation, grinding, ultrasonication, ball milling, sand milling, and impingement milling.

The formulated dispersions may be applied to substrates by any of a variety of well-known coating methods and dried using conventional techniques. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture may be accomplished by any of a variety of conventional means. Examples of suitable methods for the removal of liquid from the mixture include, but are not limited to, hot air convection, heat, infrared radiation, flowing gases, vacuum, reduced pressure, extraction, and by simply air drying. The drying and crosslinking step may be performed at a range of temperatures. Suitable temperatures are those above which the liquid medium becomes volatile, typically above the boiling point, and also at or above which the crosslinking reaction between the polymeric material having carboxyl groups and the crosslinking agent proceeds at an acceptable rate. In one embodiment of the present invention, the drying and crosslinking step is performed at a temperature of from about 60° C. to about 170° C. In a preferred embodiment, the drying and crosslinking step is performed at a temperature from 80° C. to 140° C.

The preferred temperature of the drying and crosslinking step is particularly well suited to thin film plastic substrates, such as from 5 to 15 microns in thickness, which are desirable in making low weight, i.e. high gravimetric density, cells. In a preferred embodiment, the substrate is a metallized plastic film of less than 15 microns in thickness. Thin plastic film substrates are readily deformed under more elevated temperature conditions. It is, therefore, a benefit of the composite cathode compositions of the present invention that they can be coated on thin plastic substrates to form low weight cells.

The surfaces of the composite cathodes of the present invention have been found to be very smooth by visual observation and by examination by scanning electron microscopy (SEM). For example, SEM scans of the surface of Example 1 and Comparative Example 1 showed Example 1 to have a uniform surface whereas the surface of Comparative Example 1 showed significant cracks. It is particularly advantageous to have smooth and uniform surfaces in the fabrication of thin film cells and in coating additional layers, for example separator layers as described in U.S. patent application Ser. No. 08/995,089, now U.S. Pat. No. 6,153,337, to Carlson et al., and U.S. patent application Ser. Nos. 09/215,029, 09/399,967 and 09/447,901, now U.S. Pat. Nos. 6,194,098, 6,183,201, and 6,277,514 respectively, to Ying et al., all of the common assignee.

Thus, in one embodiment, the present invention pertains to a method for the preparation of a solid composite cathode, said method comprising the steps of:

(a) dispersing or dissolving, in a liquid medium, an electroactive sulfur-containing material, a polymeric material having carboxyl groups, a crosslinking agent, and a conductive filler;

(b) casting the composition resulting from step (a) onto a suitable substrate; and (c) removing some or all of the liquid from the composition resulting from step (b) and crosslinking the polymeric material and the crosslinking agent to provide a solid composite cathode.

Examples of liquid media suitable for use in the methods of the present invention include, but are not limited to, aqueous liquids, non-aqueous liquids, and mixtures thereof. Preferred liquids are aqueous liquids and mixtures of water and non-aqueous liquids such as methanol, ethanol, and isopropanol.

Optionally, non-electroactive metal oxides, cationic polymers, as described in U.S. Pat. No. 6,110,619 to Zhang et al., and other additives may be added to the mixture at one or more of the various steps in the methods, usually at steps which involve dissolving, dispersing, or mixing. Such additives often facilitate adhesion, cohesion, and current collection.

Anodes

Suitable anode active materials, comprising lithium, for the anodes of the present invention include, but are not limited to, lithium metal, such as lithium foil and lithium deposited onto a substrate, such as a plastic film, and lithium alloys, such as lithium-aluminum alloys and lithium-tin alloys.

Electrolytes

The electrolytes used in electrochemical cells function as a medium for the storage and transport of ions, and in the special case of solid electrolytes and gel electrolytes, these materials may additionally function as separator materials between the anode and the cathode. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more non-aqueous liquid electrolyte solvents, gel polymer materials, or solid polymer materials. Suitable non-aqueous electrolytes for use in the present invention include, but are not limited to, organic electrolytes comprising one or more materials selected from the group consisting of liquid electrolytes, gel polymer electrolytes, and solid polymer electrolytes, as are known in the art. Examples of non-aqueous electrolytes for lithium batteries are described by Dominey in *Lithium Batteries, New Materials, Developments and Perspectives,* Chapter 4, pp. 137–165, Elsevier, Amsterdam (1994). Examples of gel polymer electrolytes and solid polymer electrolytes are described by Alamgir et al. in *Lithium Batteries, New Materials, Developments and Perspectives,* Chapter 3, pp. 93–136, Elsevier, Amsterdam (1994).

Examples of useful liquid electrolyte solvents include, but are not limited to, non-aqueous organic solvents, such as, for example, N-methyl acetamide, acetonitrile, acetals, ketals, esters, carbonates, sulfones, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

These liquid electrolyte solvents are themselves useful as plasticizers for gel polymer electrolytes. Examples of useful gel polymer electrolyte materials include, but are not limited to, those comprising polymers selected from the group consisting of polyethylene oxides, polypropylene oxides, polyacrylonitriles, polysiloxanes, polyimides, polyphosphazenes, polyethers, sulfonated polyimides, perfluorinated membranes (such as, for example, NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing.

Examples of useful solid polymer electrolyte materials include, but are not limited to, those comprising polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing. These solid polymer electrolyte materials may contain a liquid electrolyte solvent, typically at a level of less than 20% by volume of the total electrolyte.

Ionic electrolyte salts are added to the electrolyte to increase the ionic conductivity. Examples of ionic electrolyte salts for use in the present invention include, but are not limited to, LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, and $LiN(SO_2CF_3)_2$. Other electrolyte salts useful in the practice of this invention include lithium polysulfides ($Li_2S_x$), and lithium salts of organic ionic polysulfides ($LiS_xR)_z$, where x is an integer from 1 to 20, z is an integer from 1 to 3, and R is an organic group, and those disclosed in U.S. Pat. No. 5,538,812 to Lee et al. Preferred ionic electrolyte salts are LiBr, LiI, LiSCN, LiBF$_4$, LiPF$_6$, LiAsF$_6$, LiSO$_3$CF$_3$, LiN(SO$_2$CF$_3$)$_2$, and LiC(SO$_2$CF$_3$)$_3$.

Separators

The electrochemical cells of the present invention may further comprise a separator interposed between the cathode and anode. Typically, the separator is a solid non-conductive or insulative material which separates or insulates the anode and the cathode from each other and which permits the transport of ions between the anode and the cathode.

The pores of the separator may be partially or substantially filled with electrolyte. Separators may be supplied as porous free standing films which are interleaved with the anodes and the cathodes in the fabrication of electrochemical cells. Alternatively, the porous separator layer may be applied directly to the surface of one of the electrodes, for example, as described in U.S. patent application Ser. No. 08/995,089, now U.S. Pat. No. 6,153,337, to Carlson et al., U.S. patent application Ser. Nos. 09/215,029, 09/399,967, and 09/447,901, now U.S. Pat. Nos. 6,194,098, 6,183,201, and 6,277,514 respectively, to Ying et al., all of the common assignee, and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous pseudo-boehmite layer, which may be provided either as a free standing film or by a direct coating application on one of the electrodes, as described in PCT Publication No. WO 99/33125, by Carlson et al. of the common assignee. Solid polymer electrolytes and gel polymer electrolytes may also function as a separator in addition to their electrolyte function.

In one embodiment, the solid porous separator is a porous polyolefin separator. In one embodiment, the solid porous separator comprises a microporous xerogel layer, such as, for example, a microporous pseudo-boehmite layer.

Cells and Batteries

Cells or batteries of the present invention comprising solid composite cathodes as described herein, may be made in a variety of sizes and configurations which are known to those skilled in the art. These battery design configurations include, but are not limited to, planar, prismatic, jelly roll, w-fold, stacked and the like. Although the methods of the present invention are particularly suitable for use with thin film electrodes, they may nevertheless be beneficial in thick film designs. Alternatively, designs incorporating both low and high surface area regions, as described in U.S. Pat. Nos. 5,935,724 and 5,935,728 to Spillman et al., can be incorporated into jellyroll and other configurations.

Thin film electrodes may be configured into prismatic designs. With the drive to conserve weight, thin film barrier materials are particularly preferred, e.g., foils. For example, PCT Publication No. WO 00/36678 (International Application No. PCT/US99/30133) to Thibault et al. of the common assignee describes methods for preparing prismatic cells in which suitable barrier materials for sealed casing, methods of filling cells with electrolyte, and methods of sealing the casing, are described.

EXAMPLES

Several embodiments of the present invention are described in the following examples, which are offered by way of illustration and not by way of limitation.

Example 1

Solid composite cathodes were fabricated using an acrylate-acrylic acid copolymer crosslinked by polyfunctional aziridine as binder and elemental sulfur as active cathode material. A cathode slurry, with a solid content of 14% by weight, was prepared in a solvent mixture of 80% isopropanol, 12% water, 15% I-methoxy-2-propanol and 3% dimethyl ethanolamine (by weight). The solid slurry components were elemental sulfur (available from Aldrich Chemical Company, Milwaukee, Wis.), 70% by weight; Printex XE-2 (a trade name for conductive carbon available from Degussa Corporation, Akron, Ohio), 15% by weight; graphite (available from Fluka/Sigma-Aldrich, Milwaukee, Wis.), 10% by weight; TA22-8 resin (a trade name for an ethyl acrylate-acrylic acid copolymer available from Dock Resins Corporation, Linden, N.J.), 4% by weight; and Ionac PFAZ-322 (a trade name for trimethylol propane tris [β-(N-2-methyl aziridinyl)propionate], available from Sybron Chemicals Inc., Birmingham, N.J.), 1% by weight. The slurry was coated by a slot die coater onto both sides of a 18 micron thick conductive carbon coated aluminum foil (Product No. 60303 available from Rexam Graphics, South Hadley, Mass.), as a current collector. The coating was dried in the ovens of a slot die coater. The resulting dry cathode active layer had a thickness of about 20 microns on each side of the current collector, with a loading of electroactive cathode material of about 1.1 mg/cm$^2$.

Prismatic cells were fabricated from the coated cathode. The anode was lithium foil of about 50 microns in thickness. The electrolyte was a 1.4 M solution of lithium bis (trifluoromethylsulfonyl)imide, (lithium imide, available from 3M Corporation, St. Paul, Minn.) in a 42:58 volume ratio mixture of 1,3-dioxolane and dimethoxyethane. The porous separator used was 16 micron E25 SETELA (a trademark for a polyolefin separator available from Mobil Chemical Company, Films Division, Pittsford, N.Y.). The above components were combined into a layered structure of cathode/separator/anode, which was wound and compressed, with the liquid electrolyte filling the void areas of the separator and cathode to form prismatic cells with an electrode area of about 840 cm$^2$. Discharge-charge cycling on these cells was done at 0.42/0.24 mA/cm$^2$, respectively, with a discharge cutoff at a voltage of 1.5V and a charge cutoff at 2.8V with 110% overcharge. GSM testing was applied at the 6$^{th}$–10$^{th}$ cycles, with 2.0 A and 0.15 A pulses. The discharge capacity at the 5$^{th}$ cycle was 840 mAh and at the 120$^{th}$ cycle was 640 mAh, as shown in FIG. 1.

Comparative Example 1

Solid composite cathodes were fabricated using elemental sulfur as active cathode material and no organic polymer binder. A cathode slurry, with a solid content of 13% by weight, in isopropanol, was prepared from elemental sulfur, 65% by weight; Printex XE-2, 15% by weight; graphite, 15% by weight; and CAB-O-SIL TS530 (a trade name for fumed silica available from Cabot Corporation, Tuscola, Ill.), 5% by weight. The mixing and coating conditions of Example 1 were used except that the binderless cathode was thermally treated at 120° C. to provide adhesion to the current collector, as described in PCT Publication No. WO 00/36674 to Xu et al. of the common assignee. Prismatic cells were prepared and tested by the methods of Example 1. The discharge capacity at the 5$^{th}$ cycle was 840 mAh and at the 120$^{th}$ cycle was 525 mAh, as shown in FIG. 1.

Example 2

Solid composite cathodes were fabricated using a vinylpyrrolidone-acrylic acid copolymer crosslinked by a polyfunctional aziridine as a binder, and elemental sulfur as the cathode active material. A cathode slurry, with a solid content of 18% by weight, was prepared in a solvent mixture of 80% isopropanol, 12% water, 15% 1-methoxy-2-propanol, and 3% dimethyl ethanolamine (by weight). The solid slurry components were elemental sulfur, 70% by weight; Printex XE-2, 15% by weight; graphite, 10% by weight; vinylpyrrolidone-acrylic acid copolymer (available from Aldrich Chemical Company, Milwaukee, Wis.), 4% by weight; and Ionac PFAZ-322, 1% by weight. The coating and cell fabrication procedures of Example 1 were used to prepare prismatic cells. The cells were tested under the conditions used in Example 1. The discharge capacity at the $5^{th}$ cycle was 770 mAh and at the $100^{th}$ cycle was 635 mAh.

Example 3

Solid composite cathodes were fabricated using a vinylacetate-crotonic acid copolymer crosslinked by a polyfunctional aziridine as a binder and elemental sulfur as active cathode material. A cathode slurry, with a solid content of 18% by weight, was prepared in a solvent mixture of 80% IPA, 12% water, 15% 1-methoxy-2-propanol and 3% dimethyl ethanolamine (by weight). The solid slurry components were elemental sulfur, 70% by weight; Printex XE-2, 15%, by weight; graphite; 10% by weight; vinylacetate-crotonic acid copolymer (available from Aldrich Chemical Company, Milwaukee, Wis.), 4% by weight and Ionac PFAZ-322, 1% by weight. The coating and cell fabrication procedures of Example 1 were used to prepare prismatic cells. The cells were tested under the conditions used in Example 1. The discharge capacity at the $5^{th}$ cycle was 605 mAh and at the $100^{th}$ cycle was 580 mAh.

Example 4

The solid composite cathode composition of Example 1 was coated on a thin film current collector. The current collector was a 6 micron thick polyester film (PET) on which was deposited a ~500 Å aluminum layer on both sides (available from Steiner Film Company, Williamstown, Mass.) and subsequently coated on both sides with a 3 micron thick conductive carbon layer (available from Rexam Graphics, Matthews, N.C.). The coating and cell fabrication procedures of Example 1 were used to prepare prismatic cells. The cells were tested under the conditions used in Example 1. The discharge capacity at the $5^{th}$ cycle was 890 mAh and at the $100^{th}$ cycle was 660 mAh.

Comparative Example 2

Coating of the solid composite cathode composition of Comparative Example 1 was attempted on the 6 micron aluminized PET thin film current collector of Example 4. The mixing and coating conditions of Comparative Example 1 were used. The thin, 6 micron, PET film was unable to withstand the heat treatment conditions needed to achieve adhesion of the cathode material. By the use of a 12 micron aluminized PET thin film current collector, it was possible to obtain adhesion of the cathode material and to prepare prismatic cells by the procedures of Example 1. The cells were tested under the conditions used in Example 1. The discharge capacity at the $5^{th}$ cycle was 900 mAh and at the $60^{th}$ cycle was 460 mAh.

Comparative Example 3

A composite cathode was made without crosslinked binder. The solid composite cathode composition of Example 1, except that the 4% by weight of TA22-8 resin and 1% by weight of PFAZ was replaced by 5% by weight of TA22-8 resin, was coated on the thin film current collector of Example 4. The mixing and coating conditions of Example 1 were used. When the coating was immersed in the lithium imide electrolyte solution of Example 1, delamination and dissolution were observed.

Comparative Example 4

A cathode slurry of 14% solids content in tetrahydrofuran was prepared from elemental sulfur, 65% by weight; Printex XE-2, 15% by weight; graphite, 15% by weight; polyurethane CA330 (a thermoplastic polyurethane available from Morton International, Inc., Seabrook, N.H.), 4% by weight; and Desmodur N75 (a polyisocyanate available from Bayer Corporation, Pittsburgh, Pa.), 1% by weight. The coating procedure of Example 1 was used to form a cathode.

Cyclic voltametry was measured at a scan rate of 10 mV/sec, using as electrolyte 1.4 M lithium bis (trifluoromethylsulfonyl)imide in a 42:58 mixture of dimethoxyethane and dioxolane to which was added polysulfide to a concentration of 5 mM. The surface area of the working electrode (cathode) was 2 $cm^2$ with a Li foil counter electrode of equal area. The cathode showed oxidation peaks at approximately 2.5 and 2.7 volts and reduction peaks at approximately 2.3 and 1.9 volts (very broad and weak). The cathode of Example 1 in cyclic voltametry under the same conditions showed an oxidation peak at approximately 2.55 volts and reduction peaks at approximately 2.2 and 1.95 volts. These peaks were much stronger than those of Comparative Example 4 demonstrating better performance of the binder of Example 1.

Example 5

The composite cathode of Example 4 was subjected to immersion in the electrolyte of Example 1 by the method of Comparative Example 3, and no delamination or dissolution was observed.

Example 6

An electroactive sulfur-containing polymer material was prepared by the oxidative polymerization of aniline in presence of sulfur. To a dispersion of KS-95 (a colloidal sulfur available from Bayer, Corporation, Pittsburgh, Pa.) (750 g) and aniline (25 g) in 7 L of aqueous hydrochloric acid was added a solution of sodium persulfate (38 g) in 1 L of water. After stirring the suspension overnight, the dark solid was separated by filtration and dried to yield the electroactive sulfur-containing highly branched polymer.

A solid composite cathode composition was prepared by the method of Example 1, except that the sulfur and graphite were replaced by the electroactive sulfur-containing polymer, 65% by weight, and graphite, 15% by weight. The coating and cell fabrication procedures of Example 1 were used to prepare prismatic cells. The cells were tested under the conditions used in Example 1. The discharge capacity at the $5^{th}$ cycle was 1030 mAh and at the $40^{th}$ cycle was 850 mAh.

While the invention has been described in detail and with reference to specific and general embodiments thereof, it will be apparent to one skilled in the art that various changes and modifications can be made therein without departing from the spirit and scope thereof.

What is claimed is:

1. A solid composite cathode of an electrochemical cell, said solid composite cathode comprising:

(a) an electroactive sulfur-containing material;
(b) a crosslinked polymer formed from a reaction of a polymeric material having carboxyl groups and a crosslinking agent; and
(c) a conductive filler.

2. The composite cathode of claim 1, wherein said polymeric material having carboxyl groups is selected from the group consisting of polymers and copolymers of acrylic acid, methacrylic acid, crotonic acid, fumaric acid, and maleic acid.

3. The composite cathode of claim 2, wherein said polymeric material having carboxyl groups is a copolymer of acrylic acid.

4. The composite cathode of claim 3, wherein said copolymer of acrylic acid is selected from the group consisting of ethyl acrylate-acrylic acid copolymers, butyl acrylate-acrylic acid copolymers, vinyl pyrrolidone-acrylic acid copolymers, ethylene-acrylic acid copolymers, and vinyl acetate-acrylic acid copolymers.

5. The composite cathode of claim 2, wherein said polymeric material having carboxyl groups is a copolymer of crotonic acid.

6. The composite cathode of claim 1, wherein said crosslinking agent is selected from the group consisting of aziridines, phenolic resins, and melamine resins.

7. The composite cathode of claim 6, wherein said aziridine crosslinking agent is selected from the group consisting of trimethylol propane tris [β-(N-2-methyl aziridinyl) propionate], trimethylol propane tris [β-(N-aziridinyl) propionate], and pentaerythritol tris [β-(N-aziridinyl) propionate].

8. The composite cathode of claim 1, wherein said conductive filler is selected from the group consisting of carbon black, graphites, activated carbon fibers, non-activated carbon nanofibers, metal flakes, metal powders, and electrically conductive polymers.

9. The composite cathode of claim 1, wherein said composite cathode comprises from 60 to 85% by weight of said electroactive sulfur-containing material.

10. The composite cathode of claim 1, wherein said composite cathode comprises from 2 to 10% by weight of said crosslinked polymer.

11. The composite cathode of claim 1, wherein said composite cathode comprises from 15 to 35% by weight of said conductive filler.

12. The composite cathode of claim 1, wherein said electroactive sulfur-containing material comprises elemental sulfur.

13. The composite cathode of claim 1, wherein said electroactive sulfur-containing material, in the oxidized state, comprises a polysulfide moiety of the formula, $S_m$, wherein m is an integer equal to or greater than 3.

14. An electrochemical cell comprising:
(i) an anode comprising lithium;
(ii) a solid composite cathode comprising:
(a) an electroactive sulfur-containing material;
(b) a crosslinked polymer formed from a reaction of a polymeric material having carboxyl groups and a crosslinking agent; and
(c) a conductive filler; and
(iii) an electrolyte interposed between said anode and said cathode.

15. The cell of claim 14, wherein said anode comprises one or more materials selected from the group consisting of lithium metal, lithium-aluminum alloys, lithium-tin alloys, lithium-intercalated carbons, and lithium-intercalated graphites.

16. The cell of claim 14, wherein said electroactive sulfur-containing material comprises elemental sulfur.

17. The cell of claim 14, wherein said electroactive sulfur-containing material, in the oxidized state, comprises a polysulfide moiety of the formula, $S_m$, wherein m is an integer equal to or greater than 3.

18. A method of forming a solid composite cathode of an electrochemical cell, wherein said method comprises the steps of:
(a) dispersing or dissolving, in a liquid medium, an electroactive sulfur-containing material, a polymeric material having carboxyl groups, a crosslinking agent, and a conductive filler;
(b) casting the composition resulting from step (a) onto a substrate; and
(c) removing some or all of the liquid from the composition resulting from step (b) and crosslinking said polymeric material and said crosslinking agent to provide a solid composite cathode.

19. The method of claim 18, wherein said substrate is a metallized plastic film.

20. The method of claim 18, wherein said metallized plastic film is less than 15 microns in thickness.

* * * * *